(12) United States Patent  (10) Patent No.: US 9,076,076 B1
Ioffe et al.  (45) Date of Patent: Jul. 7, 2015

(54) IMAGE SIMILARITY DETERMINATION (75) Inventors: Sergey Ioffe, Mountain View, CA (US); Troy Chinen, Newark, CA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 13/586,269

(22) Filed: Aug. 15, 2012

Related U.S. Application Data (60) Provisional application No. 61/617,989, filed on Mar. 30, 2012.

(51) Int. Cl.
G06K 9/62 (2006.01)
H04N 5/225 (2006.01)
G06K 9/46 (2006.01)
G06F 17/30 (2006.01)
G06T 7/40 (2006.01)
G06K 9/64 (2006.01)

(52) U.S. Cl.
CPC ............. G06K 9/6215 (2013.01); G06K 9/46 (2013.01); G06K 9/6212 (2013.01); G06F 17/3028 (2013.01); G06T 7/408 (2013.01); G06T 7/40 (2013.01); G06K 2009/4666 (2013.01)

(58) Field of Classification Search
None
See application file for complete search history.

(56) References Cited

U.S. PATENT DOCUMENTS 7,630,545 B2 * 12/2009 Cieplinski ...................... 382/167
8,249,343 B2 * 8/2012 Perronnin et al. ............. 382/168
8,682,097 B2 * 3/2014 Steinberg et al. ............. 382/275

OTHER PUBLICATIONS

"Continuous Mode in Goggles—Google Mobile Help", [online]. Retrieved from the Internet: <support.google.com/mobile/bin/answer>, Mar. 20, 2012, 1 page.
"Data Usage in Continuous Mode—Google Mobile Help", [online]. Retrieved from the Internet: <support.google.com/mobile/bin/answer>, Mar. 20, 2012, 1 page.
"Enable Goggles Search History—Google Mobile Help", [online]. Retrieved from the Internet: <support.google.com/mobile/bin/answer>, Mar. 20, 2012, 1 page.
"Enable Search From Camera—Google Mobile Help" [online]. Retrieved from the Internet: <support.google.com/mobile/bin/answer>, Mar. 20, 2012, 1 page.
"Google Goggles", [online]. Retrieved from the Internet: <www.google.com/mobile/goggles>, Mar. 20, 2012, 1 pages.
"Improving Search Results—Google Mobile Help", [online]. Retrieved from the Internet: <support.google.com/mobile/bin/answer>, Mar. 20, 2012, 2 pages.
"Learn More About Goggles Search History and Continuous Mode—Google Mobile Help", [online]. Retrieved from the Internet: <support.google.com/mobile/bin/answer>, Mar. 20, 2012, 1 page.
"Overview—Google Mobile Help", [online]. Retrieved from the Internet: <support.google.com/mobile/bin/answer>, Mar. 20, 2012, 2 pages.
"Release Notes—Google Mobile Help" [online]. Retrieved from the Internet: <support.google.com/mobile/bin/answer>, Mar. 20, 2012, 2 pages.

(Continued)

*Primary Examiner* — Chan Park
*Assistant Examiner* — Elisa Rice
(74) *Attorney, Agent, or Firm* — Fish & Richardson P.C.

(57) ABSTRACT

A system and method is provided that determines whether objects in one image are visually similar to objects in another image by replacing the images' backgrounds with other images, such as a solid color or an image with texture, and comparing the resulting histograms.

17 Claims, 11 Drawing Sheets

(56) References Cited

OTHER PUBLICATIONS

"Remove or Disable Goggles Search History—Google Mobile Help" [online]. Retrieved from the internet: <support.google.com/mobile/bin/answer>, Mar. 20, 2012, 1 page.

"Requirements for Using Goggles—Google Mobile Help", [online]. Retrieved from the Internet: <support.google.com/mobile/bin/answer>, Mar. 20, 2012, 1 page.

"Search Results Page—Google Mobile Help" [online]. Retrieved from the internet: <support.google.com/mobile/bin/answer>, Mar. 20, 2012, 1 page.

"Sharing Goggles Results—Google Mobile Help" [online]. Retrieved from the internet: <support.google.com/mobile/bin/answer>, Mar. 20, 2012, 1 page.

"Translate Text With Goggles—Google Mobile Help" [online]. Retrieved from the internet: <support.google.com/mobile/bin/answer>, Mar. 20, 2012, 2 pages.

"User Generated Content in Goggles 1.7—Google Mobile Help" [online]. Retrieved from the internet: <support.google.com/mobile/bin/answer>, Mar. 20, 2012, 2 pages.

"View Goggles Search History" [online]. Retrieved from the internet: <support.google.com/mobile/bin/answer>, Mar. 20, 2012, 1 page.

* cited by examiner

IMAGE SIMILARITY DETERMINATION

CROSS-REFERENCE TO RELATED APPLICATIONS

The present application claims the benefit of the filing date of U.S. Provisional Patent Application No. 61/617,989 filed Mar. 30, 2012, the disclosure of which is hereby incorporated herein by reference.

BACKGROUND

Histograms may be used to determine whether two different images are visually similar. Histograms may be calculated for each image and then compared. The similarity of the histograms may be used as a factor in determining whether the images are sufficiently visually similar to be considered a match.

Augmented reality applications permit a user to view a scene that is interlaced with information about the scene. By way of example, as a user manipulates a video camera, an augmented reality application may analyze some of the visual characteristics in the captured scene. If the application is able to obtain more information about an object in the scene based on the visual characteristics, additional information about the object may be displayed on a screen connected to the camera when the video is shown to the user. An augmented reality application may use image matching in order to obtain additional information about an object appearing in one or more of the captured images.

SUMMARY

In some aspects, a method includes receiving a first image captured by a camera and segregating, with a processor, the first image into a first portion and a second portion so that the first portion is likely to contain objects in the foreground of the first image. A processor then determines a histogram for the first image where the second portion of the first image is replaced with a second image, e.g., the background is replaced with a solid color or pattern. A processor also determines a comparison value based on the extent of similarity between the histogram of the first image with a histogram that was determined from a third image. Based on the comparison value, metadata associated with the third image is provided, e.g., information about the type of object captured in the image can be provided to an end user for viewing.

In other aspects, a system is provided that includes one or more computers configured to provide operations such as the following. A query image and reference image data are accessed. The query image can be an image provided by a user in connection with a query. The reference image data can include image data representing the visual appearance of an object and additional data associated with the object. The operations can also include: generating a first modified copy of the query image by replacing the background of the query image with a first background image; generating a second modified copy of the query image by replacing the background of the query image with a second background image, the second background image being different than the first background image; generating a first histogram from the first modified copy and a second histogram from the second modified copy; generating a combined histogram based on elements from the both the first histogram and second histogram; generating a match value representative of the similarity of the combined histogram with a histogram generated from the reference image; and providing, if the match value meets matching criteria, the additional data to a device. values.

Still more aspects relate to a device that includes a processor, a display, a camera and a memory. The memory contains instructions accessible by the processor and the instructions include: capturing an image with the camera; transmitting the captured image as a request for additional information relating to the objects appearing in the image; receiving information related to an object appearing in the image, the information being determined by determining a first portion of the captured image that is likely to contain an object of interest to the user, generating a histogram for the query image such that a second portion of the captured image that is different from the first portion is replaced with a different image, and retrieving the information by comparing the histogram with histograms of other images associated with the information; and displaying the information.

DETAILED DESCRIPTION

In one aspect, a system and method is provided that determines whether objects in one image are visually similar to objects in another image. In one example, two different copies of the first image are created such that one copy changes the background of the first image to a solid color and another copy changes the background of the first image to a highly texturized image. Histograms are extracted from the different copies and then combined to create a histogram that reflects the characteristics of the first image's foreground but not the background. A histogram is similarly generated for the second image. The resulting, generated histograms are then compared with one another and, if they are sufficiently similar, objects in the foreground of the first image are considered to match, from a visual point of view, objects in the foreground of the second image.

Figure 1:
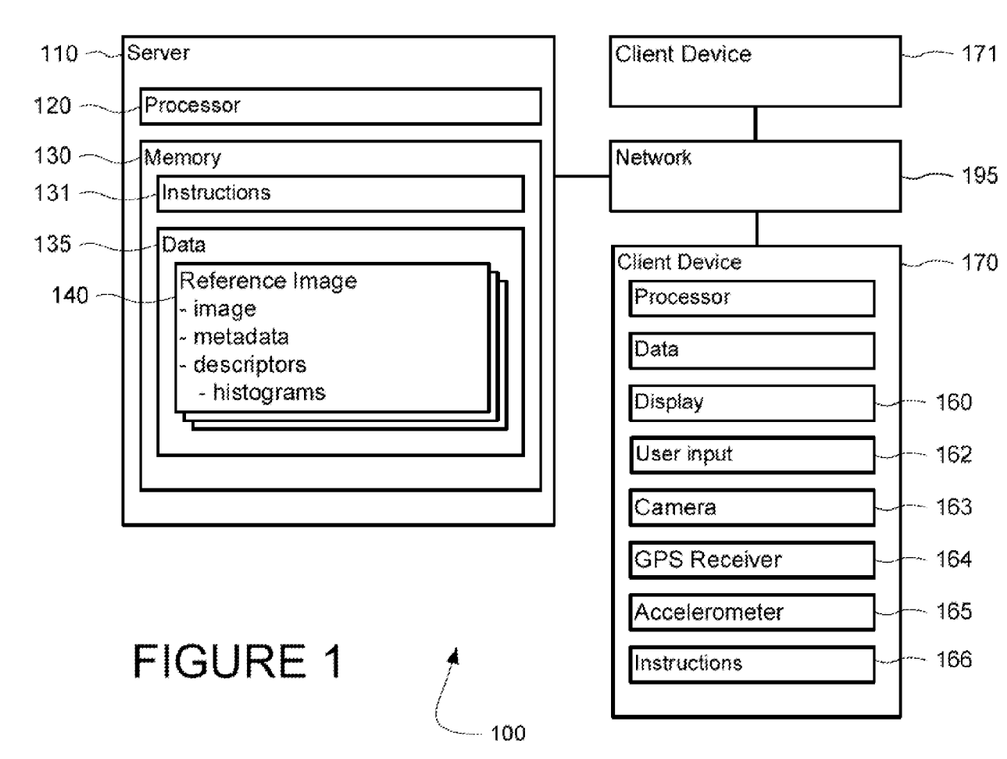
FIG. 1 is a functional diagram of a system.

As shown in FIG. 1, system 100 can include a device, such as but not limited to a computer or cell phone, containing a processor 120, memory 130 and other components typically present in general purpose computers.

In one aspect, server 110 stores information accessible by processor 120, including instructions 131 and data 135 that are executed or otherwise used by the processor 120. The memory 130 can be of any type capable of storing information accessible by the processor, including a computer-readable medium or other medium that stores data that can be read with the aid of an electronic device, such as ROM, RAM, a magnetic or solid-state based hard-drive, a memory card, a DVD or other optical disks, as well as other volatile and non-volatile write-capable and read-only memories. The system can include different combinations of the foregoing, and different portions of the instructions and data are stored on different types of media.

The instructions 131 can be any set of instructions to be executed directly such as object code or indirectly such as scripts or collections of independent source code modules interpreted on demand by the processor. For example, the instructions can be stored as computer code on a computer-readable medium. In that regard, the terms "instructions," "programs" and "applications" may be used interchangeably herein. Functions, methods and routines of the instructions are explained in more detail below.

Data 135 is retrieved, stored or modified by processor 120 in accordance with instructions 131. For instance, while the data is not limited to any particular data structure, the data can be stored in computer registers, in a relational database as a table having multiple different fields and records, XML documents or flat files. The data can also be formatted in any computer-readable format. By further way of example only, image data can be stored as bitmaps of grids of pixels that are stored in accordance with formats that are compressed or uncompressed, lossless such as BMP or lossy such as JPEG, and bitmap or vector-based such as SVG, as well as computer instructions for drawing graphics. The data can include any information sufficient to identify the relevant information, such as numbers, descriptive text, proprietary codes, references to data stored in other areas of the same memory or different memories including other network locations, or information that is used by a function to calculate the relevant data.

The processor 120 can be any conventional processor. Alternatively, the processor can be a dedicated device such as an ASIC. Although FIG. 1 functionally illustrates the processor, memory, and other elements as being within the same block, the processor and memory can actually include multiple processors and memories that may or may not be stored within the same physical housing. For example, rather than being stored in the same computer, processor 120 and memory 130 can be stored in separate devices. Although there can be advantages to locating the processor 120 and memory 130 within the same housing of a single device, various processes can be performed externally to the device and various data can be stored externally of the device. For example, if a processor or memory used or required by a device is externally located, the information can be obtained wirelessly. Moreover, server 110 can display information on device 170 by transmitting, over a network, the information to device 170 such that the information is shown on a display 160 incorporated in device 170. Accordingly, although references to a processor or memory herein assume that the processor and memory are stored internally within server 110, such references include references to a collection of processors or computers or memories that may or may not operate in parallel and may or may not be located a single housing.

The server 110 can be at one node of a network 195 and capable of directly and indirectly communicating with other nodes of the network such as client devices 170-71 with use of a communication component. Network 195 and the server's communication with other devices, including computers, connected to the network can include and use various configurations and protocols including cellular networks such as 3GPP Long Term Evolution (LTE), other wireless networks such as WiFi, the Internet, intranets, virtual private networks, local Ethernet networks, private networks using communication protocols proprietary to one or more companies, instant messaging, HTTP and SMTP, and various combinations of the foregoing. Although only a few devices are depicted in FIG. 1, a typical system can include a large number of connected devices.

While not limited to any particular type of product, device 170 is a cell phone, tablet or portable personal computer intended for use by a person and includes components normally used in connection with such devices such as an electronic display 160, user input 162, camera 163, speakers, a network interface device and all of the components used for connecting these elements to one another. By way of example, the display can be a small LCD touch-screen, a monitor having a screen, a projector, a television, or any other electrical device that is operable to display information. User input 162 can include a mouse, keyboard, touch screen or microphone. Indeed, devices in accordance with the systems and methods described herein can include any device capable of processing instructions and transmitting data to and from humans including general purpose computers.

Figure 2:
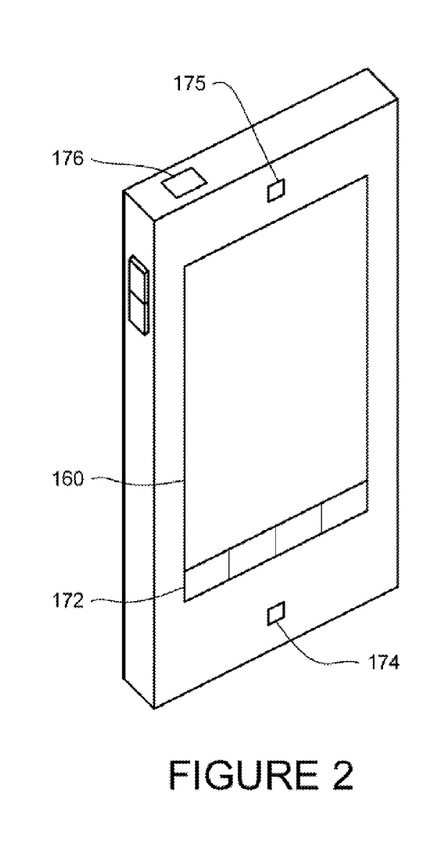
FIG. 2 illustrates the outer appearance of the front of a device.
Figure 3:
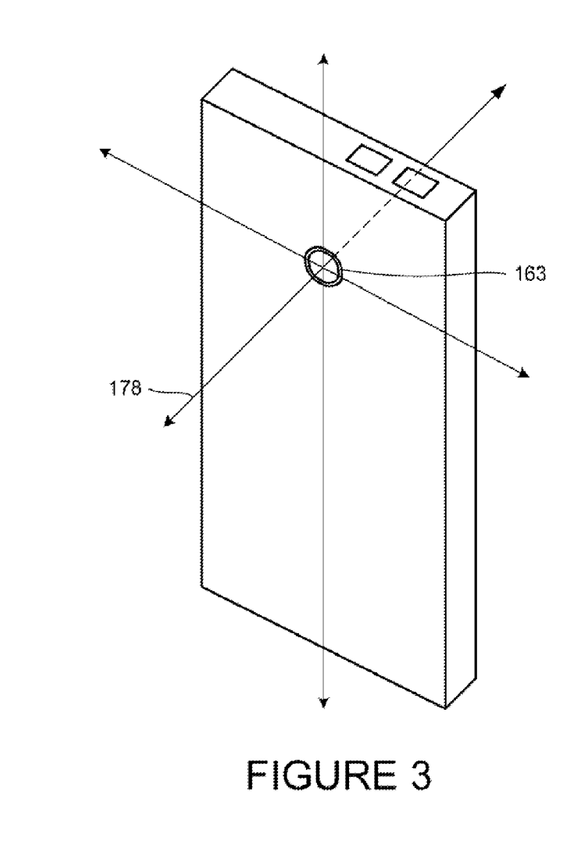
FIG. 3 illustrates the outer appearance of the back of a device.

FIGS. 2 and 3 illustrate one possible configuration of device 170. The front side of the device includes a touch-screen display 160, buttons 172, speaker 175, microphone 174 and a cell-phone antenna 176. As shown in FIG. 3, a camera is disposed on the back side of the device. The camera angle is fixed relative to the orientation of the device. In that regard, the device, e.g., the phone and the camera, can change position by moving along one or more of the axes 178 shown in FIG. 3 and can also change its orientation by rotating relative to one or more of the axes.

Figure 4:
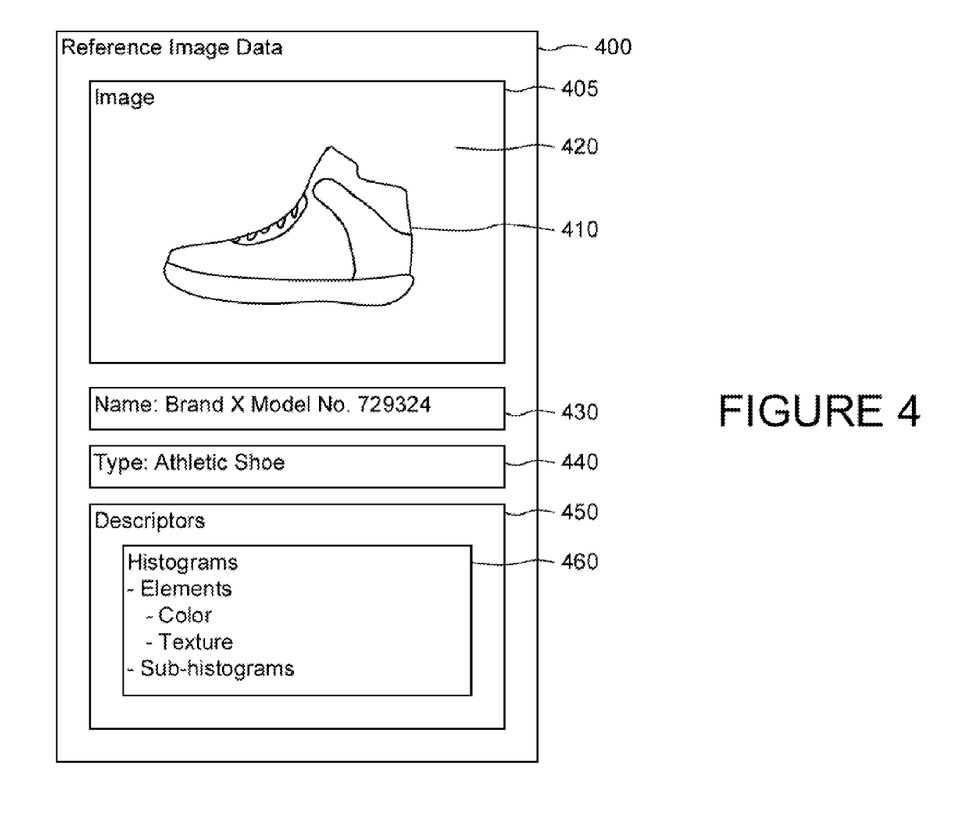
FIG. 4 illustrates a reference image and associated data.

The data 135 accessible by server 110 can include a corpus of reference images 140 that are associated with metadata. Each reference image can represent the visual appearance of one or more objects. As shown in FIG. 4, reference image data 400 includes a photograph 405 taken by a professional for the primary purpose of serving as a reference image, such as a picture of a well-lit object 410 placed in front of a white backdrop 420. However, a reference image can include other images as well, such as non-professional images submitted from users or gleaned from websites. The reference image can be any image that is intended to allow a computer to retrieve the associated metadata based on the similarity of the reference image with another image.

The metadata associated with the image can be and include a wide variety of data, such as the name 430 and type 440 of the object. In one aspect, the metadata is intended to provide users with information about the object represented in the image, and includes plain text that can be provided directly to a user such as the name 430. The metadata can also be a pointer to such information, such as the IP address of an HTML document containing more information about the object or terms to be used in a search query.

The reference image data 400 can also include descriptors 450 of the visual content of the image 405. The descriptors can be used to make matching the reference image with other images more efficient. For example, descriptors for image interest points can be extracted from the image. A descriptor can include one or more of the following types of information: information extracted from local pixels around an interest point, such as a point in the image having a clear definition and that is mathematically well-founded; information having a well-defined position in image space; information having a local image structure that is rich in terms of local information contents; and information that is stable under local and global perturbations in the image domain.

The descriptors for the reference images can include histograms 460. By way of example only, a color histogram can identify, for a range of different colors, a value that is related to the number of pixels of that color in the image. The precision and breadth of the histogram and its elements can vary, e.g., the histogram can describe the distribution of a few colors with each color being defined by a wide range, e.g., the eight colors of a rainbow. The histogram can also describe the distribution of many different colors with each color being defined by a narrow range, e.g., a thousand subtly different shades of blue). The histograms can also include texture histograms that identify the extent to which the image has areas that appear smooth, e.g., colors that spatially change slowly such as a clear blue sky, or areas that appear rough, e.g., a spatial portion containing densely-packed highly-contrasting colors such as leaves on a tree. Moreover, a histogram can be prepared by concatenating smaller histograms. In that regard, the term histogram as used herein refers to a single histogram as well as a collection or concatenation of histograms.

Figure 15:
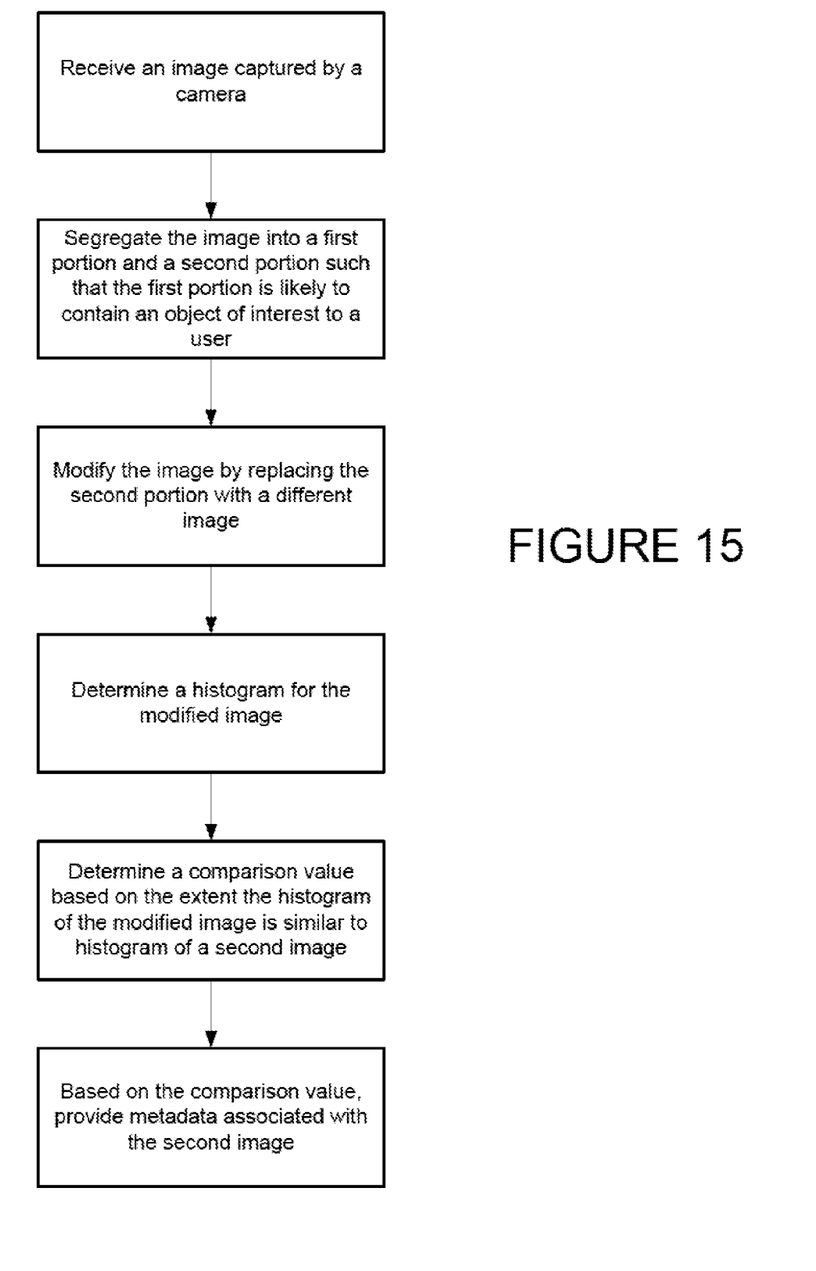
FIG. 15 is a flow chart.

In addition to the operations described in FIGS. 11 and 15, operations in accordance with the system and method will now be described. Various operations can be handled in a different order or simultaneously, each operation can be composed of other operations, and many of the operations described are optional.

Figure 5:
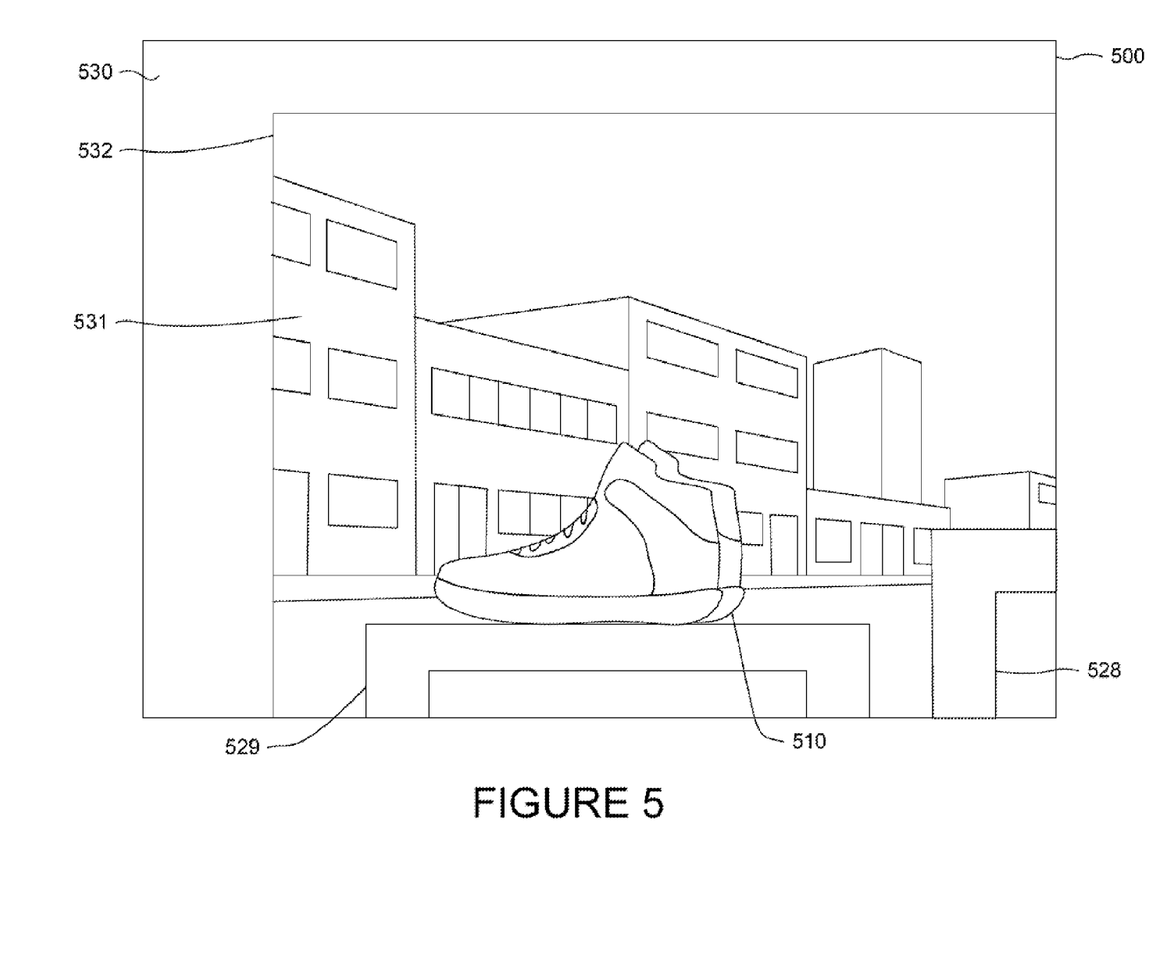
FIG. 5 illustrates a sample image captured by a camera-enabled device.

Device 170 can capture images automatically for further analysis. For example, if the device is a cell phone and the user is interested in obtaining more information about an object, the user can activate a program stored on the device 170 that is executed by its processor. Upon activation, the program can cause camera 163 to capture one or more images within its field of view. The device can analyze the image itself or transmit the image to a server for further analysis. For example, while some devices may have sufficient processing and data resources to perform the requisite image analysis, others may not. In that regard, as camera 163 captures images, device 170 streams those images to server 110. A sample image 500 is illustrated in FIG. 5.

Upon receipt, the server attempts to obtain additional information based on the submitted image. By way of example, the server can use optical character recognition to extract any text that was captured in image 500 and form a search query based on the text. The server can also use the image 500 itself to query the available data. For example, the server can attempt to find a reference image 140 that is visually similar enough to query image 500 to be considered a match. For each similar reference image, a match score can be calculated that is based on the similarity between a reference image and a query image. The match score can be computed based on the number of descriptors in the two images that match. If the reference image is a match, the server provides the reference image's associated metadata to the user or uses the metadata to obtain additional information to be provided to the user.

In some aspects, foreground masking can be used to determine whether a query image is visually similar to the reference image. In the example of FIG. 5, the user has taken a photo of athletic shoes 510 in a store in order to obtain more information about the shoes. In addition to the shoes, the camera also captured a number of other objects such as shelves 528-29, wall 530 and window 532. Buildings 531 are visible through the window and were thus captured as well.

The server can extract histograms from the query image 500 and compare the histograms with the histograms stored for the reference images. For computational efficiency, the histograms can be computed for the entire image or rectangular portions of the image. Accordingly, if color and texture histograms are prepared for image 500 containing shoes 510, the colors and textures of the shelves, wall and buildings 528-31 will contribute to those histograms. As a result, even if an object captured by a user is identical to a reference image, the objects captured in the background may prevent the histograms of the query image and reference image from being sufficiently similar to be considered a match.

Figure 6:
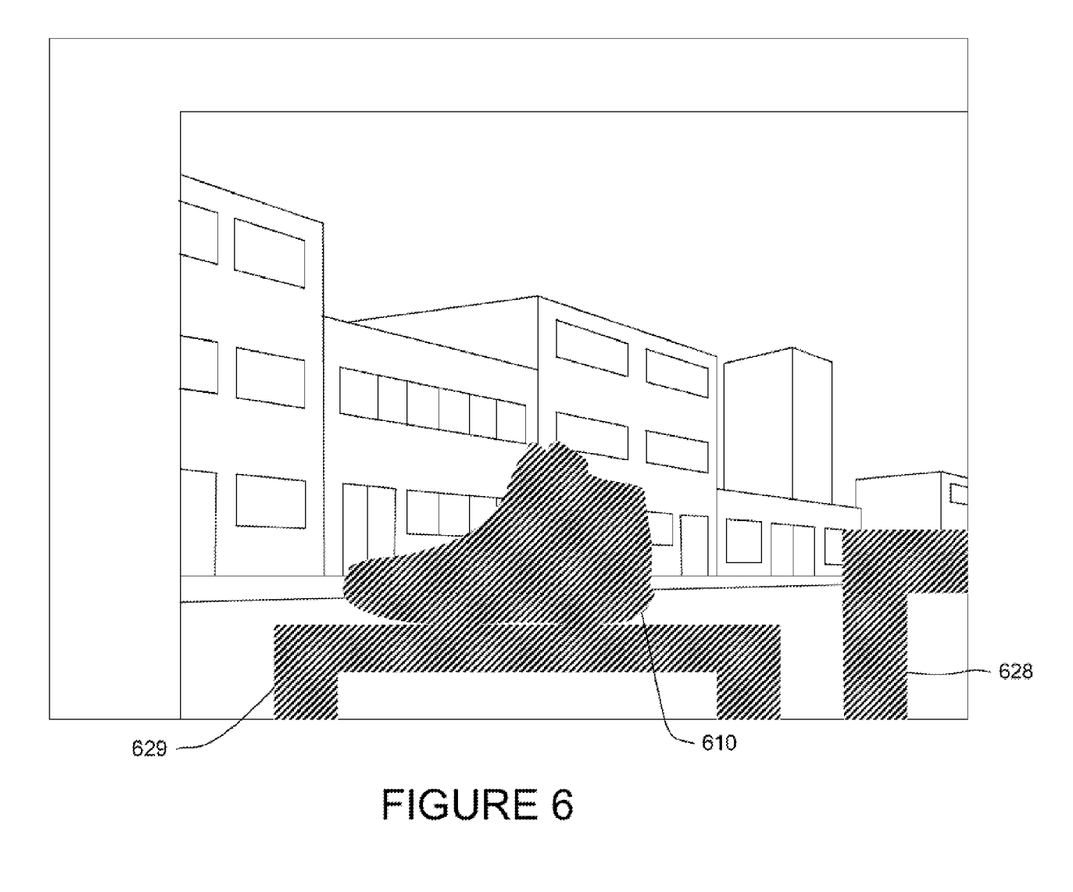
FIG. 6 illustrates the sample image of FIG. 5 with a foreground mask.

The processor may segregate the portions of the image that appear in the foreground from the background. As shown in FIG. 6, the processor identifies shaded portions 610 and 628-29 as the foreground, which correspond with shoes 510 and shelves 528-29. The foreground of the image can be determined in a variety of ways. By way of example, if some objects are blurry and others are in focus, the in-focus objects may be considered part of the foreground. Saliency detection methods and class-specific segmentation methods can also be used.

Yet further, although a precise non-rectangular mask is shown in FIG. 6, a user can provide information indicating the object of interest to the user, such as by drawing a box around an object in the image, in which case the foreground is considered to be everything within that box. The foreground mask can also be obtained by assuming that the object of interest is at the center of the image, in which the case a bounding box containing the object is determined and used as the mask. In that regard, the processor may change any portion of the image that is not likely to contain the object of interest to the user.

The data representing the foreground can be stored in a variety of formats. By way of example, the foreground mask may be stored as a two-dimensional array of Boolean values such that each cell in the array corresponds with a single pixel and its value indicates whether the pixel is or is not covered by the foreground mask. The foreground identification data can also define rectangular or non-rectangular regions that are associated with the likelihood of the regions including objects of interest to the user, e.g., by the use of ternary values, such as true, false, unknown. Analog values may also be used, e.g., a floating point number between 0 and 1.

Figure 7:
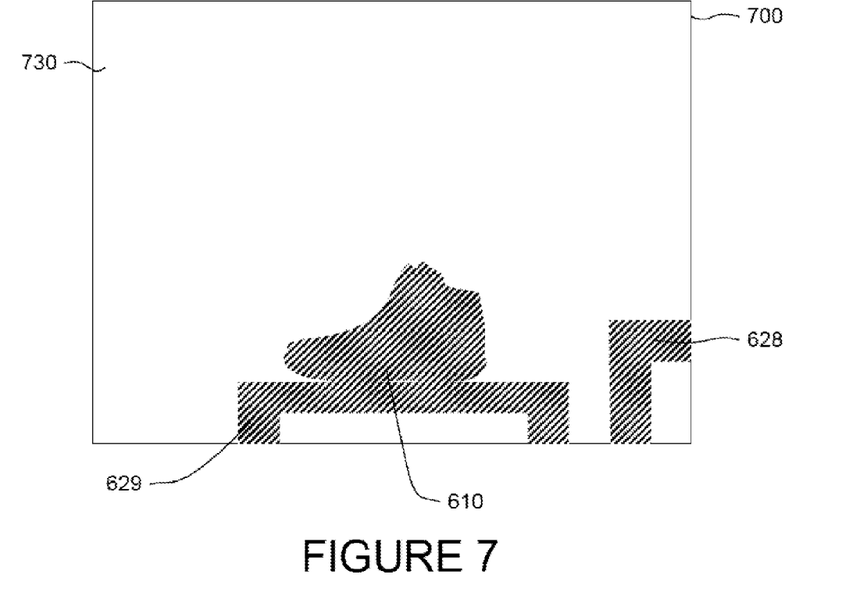
FIG. 7 illustrates the sample image of FIG. 5 with a modified solid background and foreground mask.
Figure 8:
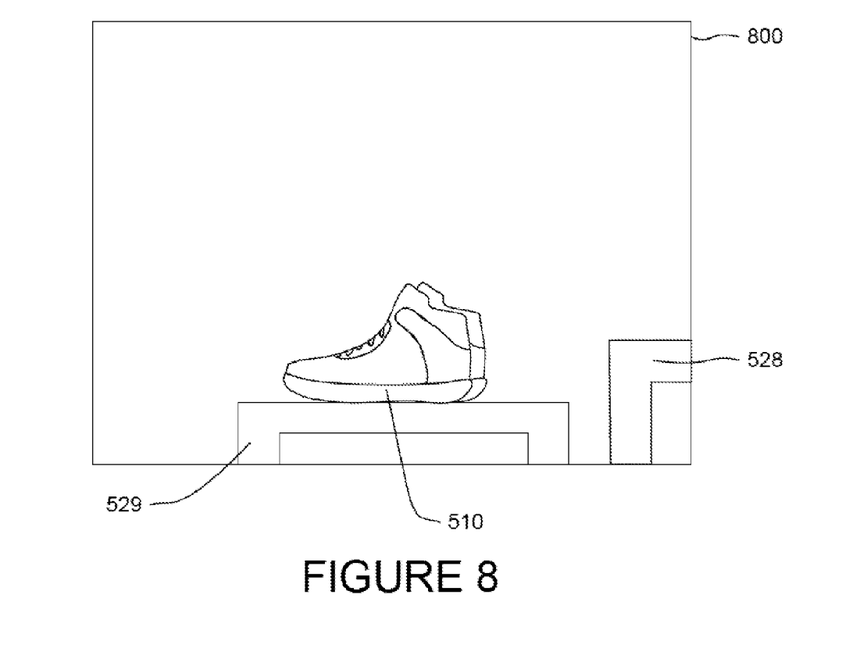
FIG. 8 illustrates the sample image of FIG. 5 with a modified solid background.

Once the image is segmented between foreground and background, the visual appearance of the background can be modified. For example, the processor can set the portions of the image existing outside of the foreground mask to a single color. As shown in FIG. 7, the processor sets the entire background 730 of image 700 to white. As shown in FIG. 8, result is in an image 800 where the portion of the image in the foreground remains unmodified but the background is a single color.

Figure 9:
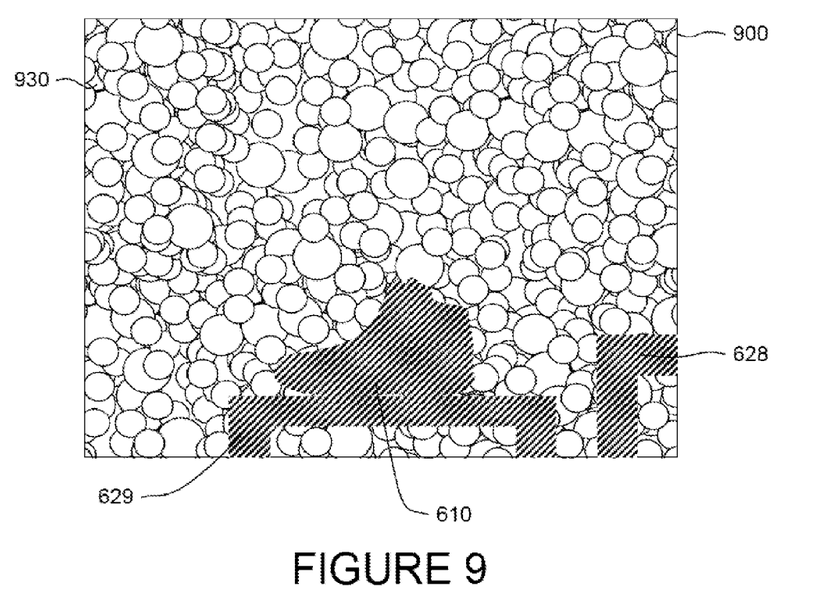
FIG. 9 illustrates the sample image of FIG. 5 with a modified texturized background and foreground mask.
Figure 10:
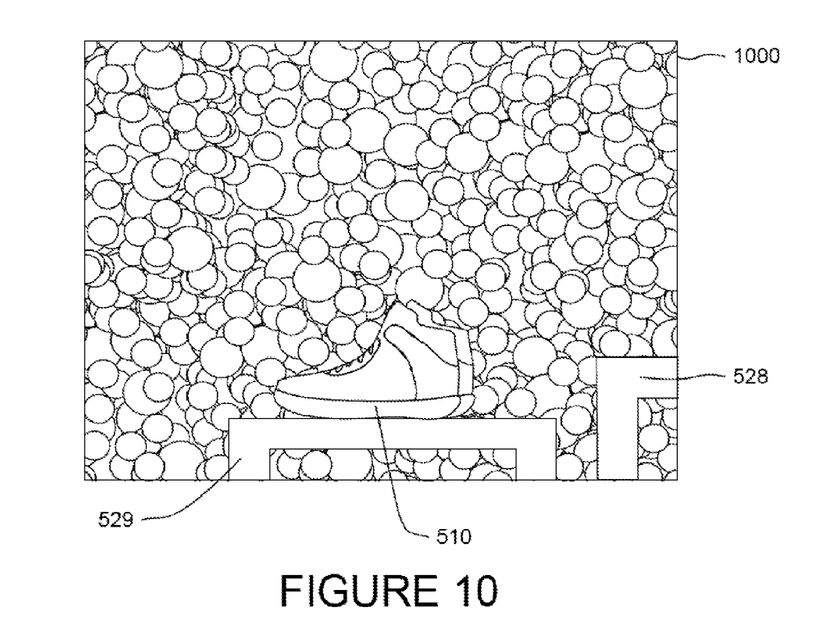
FIG. 10 illustrates the sample image of FIG. 5 with a modified texturized background.

A second image with a second background can also be prepared. The second background can be selected to have visual characteristics that are very different from the first selected background. Yet further, the second background can be selected so that the histograms of the first and second background images, when taken alone outside of the presence of the foreground, have large differences in some or many elements. By way of example, if the background of image 700 was set to a solid white color, the second background may be selected or calculated to have a large amount of texture and not a single pixel with a white color. As shown in FIG. 9, the background 930 of the image 900 can be replaced with a highly texturized image such as leaves on a tree in various shades of dark green as symbolically represented in background 930 as circles. In one aspect, none of the pixels of texturized background will be the same color as the solid background in image 800. The resultant image, which is a copy of the query image but with a texturized background, appears as image 1000 in FIG. 10. Instead of replacing the background with an existing image captured by a camera, the processor can replace the background with other images as well, such as random noise. The backgrounds can further be created for the specific purpose of providing contrasts with each other, e.g., if the first background is a solid white color, the second background can be generated by a processor to have a specific texture characteristic and range of colors.

The processor may generate histograms for the modified query images. By way of example and as shown at stages 1111-12 of FIG. 11, the processor generates color and texture histograms from the solid background image 800 and texturized background image 1000.

A new histogram may be derived from the histograms of the two modified images. In just one example, the processor calculates the intersection of the two color histograms 1150 by comparing each element of each histogram with a corresponding element in the other histogram, and then selecting the element with the lowest value as the element of the new histogram. Using the prior examples, the color histogram of the solid background image 800 should indicate the presence of a great deal of white-colored pixels because the entire background was set to white; the white element of the color histogram will reflect the white-colored pixels in both the foreground and the background. In contrast, if no white-colored pixels appear in the background, the white element of the color histogram of the texturized background image 1100 will be much lower than the color histogram for the solid background image 800; the white element of the histogram for the texturized background image will reflect only the white-colored pixels in the foreground. The processor selects the lower of the two values, e.g., the white element from the histogram of the texturized background image for that element of the new histogram. Similarly, the texture histogram of the texturized background image 1100 will have a variety of elements with values greater than the corresponding element in the texture histogram of solid background image 800. As a result, the processor selects various elements from the two texture histograms to create a histogram that represents the texture of the foreground of the image. By using histograms that are based on the modified images rather than the original image, the contribution of those elements that are not within the foreground of the original image are reduced. The derived histograms can be normalized to the same weight for the purpose of making direct comparisons.

A similar process can also be applied to the reference images. The histograms of reference image data 140 can be replaced or supplemented with histograms that were derived from the reference image with modified backgrounds, such that the result is histograms that are less affected by the background of the reference image than histograms taken from the original reference image.

Figure 11:
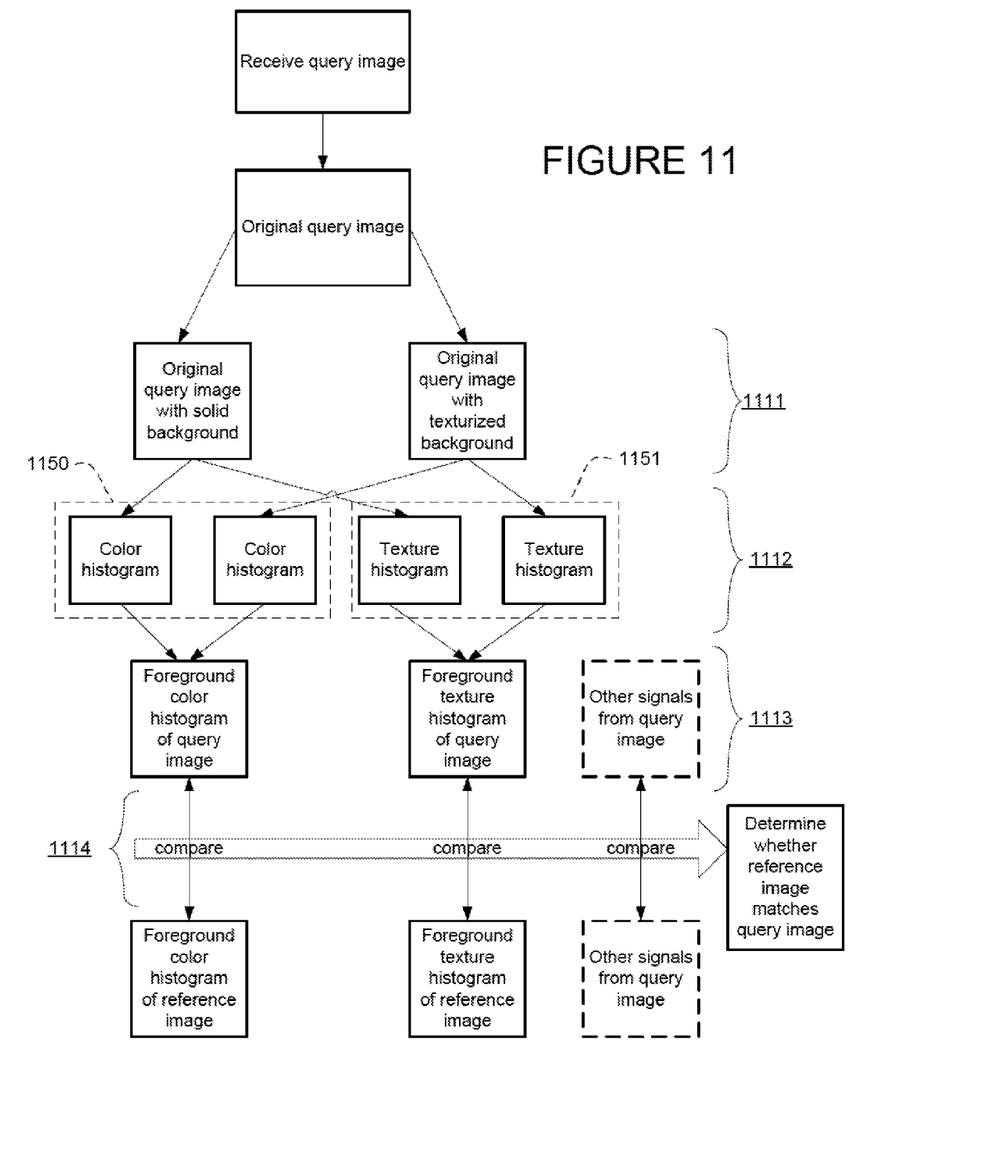
FIG. 11 is a flow chart.

As shown in stage 1114 of FIG. 11, the foreground-oriented histograms of the query image can be compared with the foreground-oriented histograms of the reference image. For example, the distance between the query image's selected texture histogram and reference image's selected texture histogram can be calculated. If the distance is below a threshold, or meets other criteria, the texture of the query image and the reference image can be considered to match even if the textures of the original unmodified images are quite different, e.g. due to the background. The foreground color histograms can be similarly compared.

If there are sufficient similarities between the foreground-oriented histograms, the query image and reference image can be assigned a value relating to the likelihood of them being a visual match. These values can be combined with other signals, such as a comparison of other descriptors of the query image and reference image, to determine whether the reference image and query image are or are not a match, or to otherwise generate a confidence value related to the likelihood of the two images capturing extremely similar objects.

In various aspects, the modifications to the background are not limited to replacing the background in one image with a solid color and the other with a highly textured image. Some aspects may rely solely on the histograms computed from the solid background image. When comparing the two images, the processor ignores those elements of the histograms that correspond with the color of the background and relies on the other elements. Alternatively, the processor can calculate the amount that the histogram element changed when the background was modified, and use the difference to offset the element during subsequent comparisons.

Figure 12:
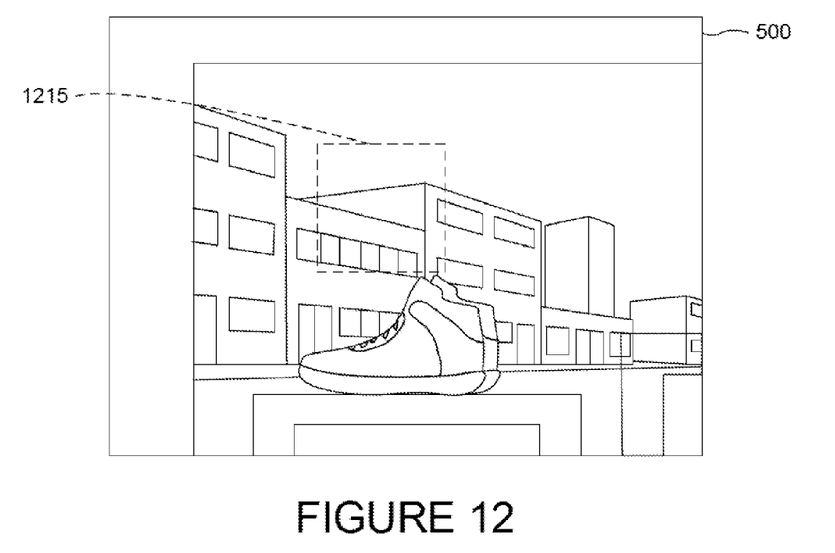
FIG. 12 illustrates the sample image and indicates a portion to be modified.
Figure 13:
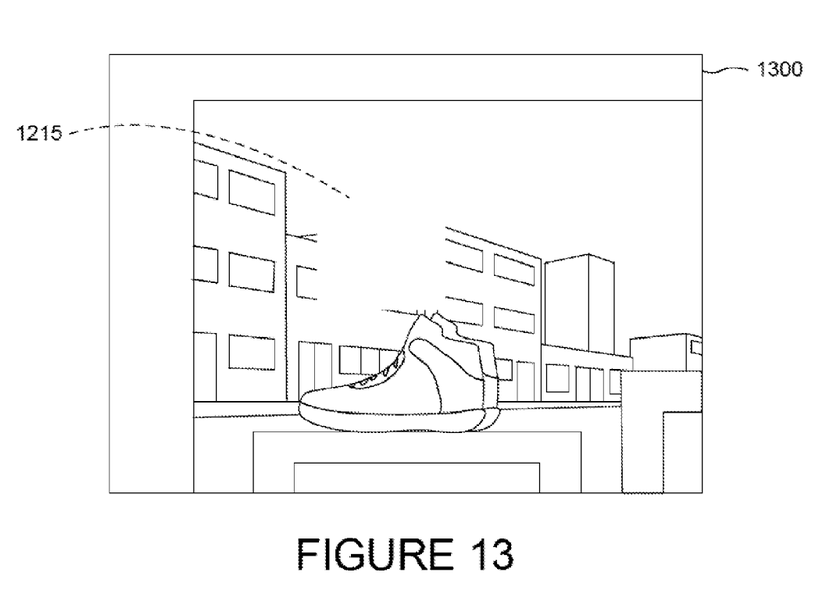
FIG. 13 illustrates the sample image with a portion modified.

In yet another aspect, the processor changes portions of the background and determines their effect on the histogram. As shown in FIGS. 12 and 13, the processor selects a cell 1215 of the background and sets all of the pixels in that cell to the same color or, in addition or alternatively, to a highly texturized image. The processor then calculates a new set of histograms for the modified image 1300 and compares them with the histograms that were calculated before the background was modified. By identifying those dimensions of the histograms that changed, the processor identifies the dimensions that are affected by the visual appearance of the background and then ignores those dimensions for the purposes of matching. For instance, if all of the pixels in background portion 1215 were set to white and the blue dimension of a color histogram significantly decreases, the processor may determine that the background is contributing to the blue dimension of the histogram of image 500. As a result, when comparing the histograms derived from image 500 with the histograms of reference images, the processor ignores the blue dimension during such comparison.

Rather than ignoring the affected dimension for the purpose of image matching, the changed values can be used to calculate the background's contribution to the query image's histograms. For example, the processor can decrease the amplitude of the blue dimension in the query image's histogram that will be compared with histograms of reference images. The decrease of the amplitude can be based on the extent of the change.

The size of the cells can be tailored to particular needs. For example, the cells can be as small as a single pixel or as large as a non-rectangular portion that includes a majority of the pixels in the background. The processor can modify a single background pixel and then calculate histograms and identify the dimensional changes due to the modification. This process can be repeated for each pixel and a lookup table created that identifies, per background pixel, each affected dimension for each pixel. The lookup table can then be queried to identify the total effect of the background on the various histograms extracted from the image. The lookup table can be quite large for large images, e.g., the elements of the table may be as large as the number of pixels multiplied by all possible histogram elements, each of which may number in the hundreds of thousands). The size of the portions can thus be increased from a single pixel to a cell of pixels. The size of the cell can be selected so as to establish a suitable ratio of table size versus precision.

Yet further, a portion of the image that includes both foreground and background pixels can be selected and analyzed. The attenuation of the histogram can be based on the percentage of foreground pixels to background pixels. By way of example the percentage can be function of H×(P/T), where H represents the histogram values, F represents the number of foreground pixels in the relevant portion, and T represents the total number of pixels of in portion.

Figure 14:
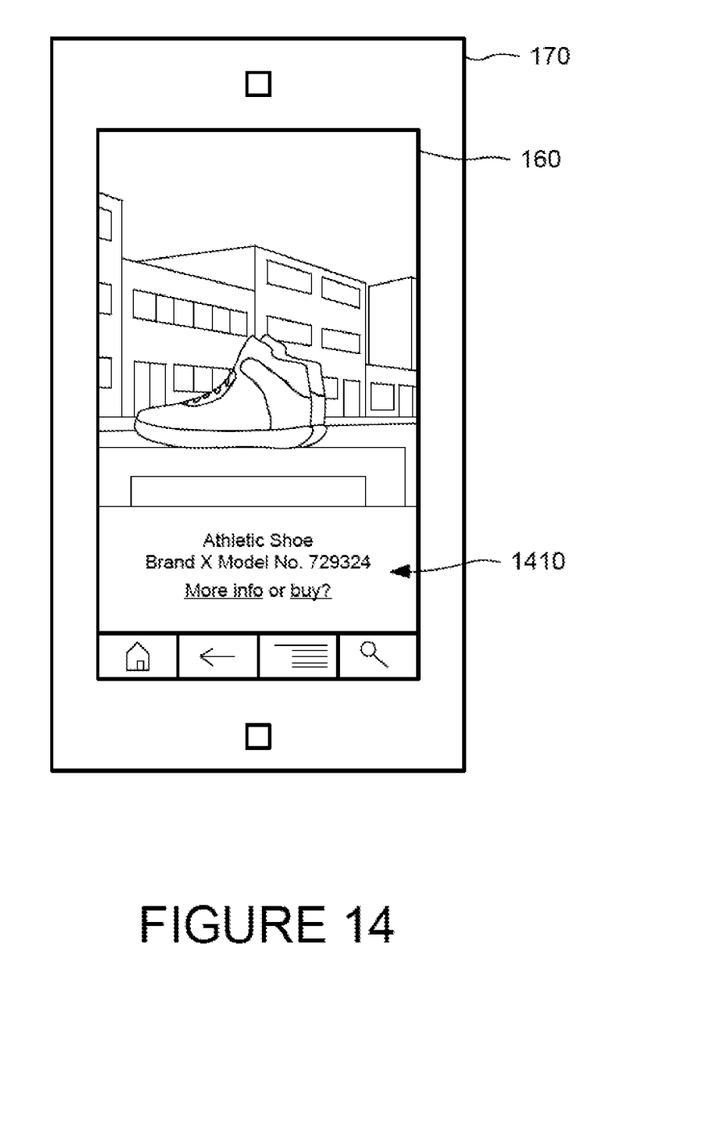
FIG. 14 illustrates a sample image displayed on a mobile device.

As noted above, when a user-submitted image is determined to match a reference image, other data associated with the reference image can be used to obtain information that can be displayed to the user. As shown in FIG. 14, the metadata 1410 for the reference image can be shown on display 160 of device 170 along with the image 500 taken by the user. The server can also provide information that the user selects to obtain additional information or purchase the product online. The metadata can further be used to query a search engine and one or more results of the search shown to the user.

The system can be configured to detect and recognize a large and great diversity of objects. By way of example, rather than being limited to a single category or object types, the server can be configured to recognize objects as diverse as books, DVDs, landmarks, barcodes, QR codes, logos, contact information, artwork, stores and other businesses, consumer and other products, text, buildings, or any other entity constituting visual indicia that can be used to obtain additional information that is not contained within the image data.

As these and other variations and combinations of the features discussed above can be utilized without departing from the systems and methods as defined by the claims, the foregoing examples should be taken by way of illustration rather than by way of limitation of the subject matter defined by the claims. The provision of examples, as well as clauses phrased as "such as," "e.g.", "including" and the like,) should not be interpreted as limiting the claimed subject matter to the specific examples; rather, the examples are intended to illustrate only some of many possible aspects. The sample values, types and configurations of data described and shown in the figures are for the purposes of illustration only. Unless expressly stated to the contrary, every feature in a given embodiment, alternative or example can be used in any other embodiment, alternative or example herein.

The invention claimed is:

1. A computer-implemented method comprising:
obtaining a pair of images comprising a first image and a second image;
segmenting each image of the pair into a respective foreground region and a respective background region;
generating (i) a first modified version of the first image by modifying the background region of the first image, (ii) a different, second modified version of the first image by modifying the foreground region of the first image, (iii) a first modified version of the second image by modifying the background region of the second image, and (iv) a different, second modified version of the second image by modifying the foreground region of the second image;
generating an image descriptor for each of (i) the first modified version of the first image in which the background region of the first image is modified, (ii) the different, second modified version of the first image in which the foreground region of the first image is modified, (iii) the first modified version of the second image in which the background region of the second image is modified, and (iv) the different, second modified version of the second image in which the foreground region of the second image is modified;
generating an aggregated image descriptor for the first image based at least on (i) the image descriptor for the first modified version of the first image in which the background region of the first image is modified, and (ii) the image descriptor for the different, second modified version of the first image in which the foreground region of the first image is modified;
generating an aggregated image descriptor for the second image based at least on (i) the image descriptor for the first modified version of the second image in which the background region of the second image is modified, and (ii) the image descriptor for the different, second modified version of the second image in which the foreground region is modified; and
classifying the pair of images as similar or as not similar based at least on (i) the aggregated image descriptor for the first image and (ii) the aggregated image descriptor for the second image.

2. The method of claim 1, wherein the image descriptors each comprise an image histogram.

3. The method of claim 1, wherein generating a different, second modified version of the first image by modifying the foreground region of the first image comprises:
replacing the background region of the obtained first image with a background region that has a single color that is different than a single color of the background region of the first modified version of the first image.

4. The method of claim 1, wherein generating an aggregated image descriptor for the first image based at least on (i) the image descriptor for the first modified version of the first image in which the background region of the first image is modified, and (ii) the image descriptor for the different, second modified version of the first image in which the foreground region of the first image is modified comprises:
determining an intersection between (i) the image descriptor for the first modified version of the first image, and (ii) the image descriptor for the different, second modified version of the first image; and
generating the aggregated image descriptor as a representation of the determined intersection.

5. The method of claim 1, wherein classifying the pair of images as similar or as not similar based at least on (i) the aggregated image descriptor for the first image and (ii) the aggregated image descriptor for the second image comprises:
determining the (i) the aggregated image descriptor for the first image and (ii) the aggregated image descriptor for the second image satisfy a similarity threshold; and
in response to determining the (i) the aggregated image descriptor for the first image and (ii) the aggregated image descriptor for the second image satisfy a similarity threshold, classifying the pair of images as similar.

6. The method of claim 5, comprising:
providing data associated with the second image for output based on classifying the pair of images as similar.

7. A system comprising:
one or more computers and one or more storage devices storing instructions that are operable, when executed by the one or more computers, to cause the one or more computers to perform operations comprising:
obtaining a pair of images comprising a first image and a second image;
segmenting each image of the pair into a respective foreground region and a respective background region;

generating (i) a first modified version of the first image by modifying the background region of the first image, (ii) a different, second modified version of the first image by modifying the foreground region of the first image, (iii) a first modified version of the second image by modifying the background region of the second image, and (iv) a different, second modified version of the second image by modifying the foreground region of the second image;

generating an image descriptor for each of (i) the first modified version of the first image in which the background region of the first image is modified, (ii) the different, second modified version of the first image in which the foreground region of the first image is modified, (iii) the first modified version of the second image in which the background region of the second image is modified, and (iv) the different, second modified version of the second image in which the foreground region of the second image is modified;

generating an aggregated image descriptor for the first image based at least on (i) the image descriptor for the first modified version of the first image in which the background region of the first image is modified, and (ii) the image descriptor for the different, second modified version of the first image in which the foreground region of the first image is modified;

generating an aggregated image descriptor for the second image based at least on (i) the image descriptor for the first modified version of the second image in which the background region of the second image is modified, and (ii) the image descriptor for the different, second modified version of the second image in which the foreground region is modified; and classifying the pair of images as similar or as not similar based at least on (i) the aggregated image descriptor for the first image and (ii) the aggregated image descriptor for the second image.

8. The system of claim 7, wherein the image descriptors each comprise an image histogram.

9. The system of claim 7, wherein generating a different, second modified version of the first image by modifying the foreground region of the first image comprises:
replacing the background region of the obtained first image with a background region that has a single color that is different than a single color of the background region of the first modified version of the first image.

10. The system of claim 7, herein generating an aggregated image descriptor for the first image based at least on (i) the image descriptor for the first modified version of the first image in which the background region of the first image is modified, and (ii) the image descriptor for the different, second modified version of the first image in which the foreground region of the first image is modified comprises:
determining an intersection between (i) the image descriptor for the first modified version of the first image, and (ii) the image descriptor for the different, second modified version of the first image; and
generating the aggregated image descriptor as a representation of the determined intersection.

11. The system of claim 7, wherein classifying the pair of images as similar or as not similar based at least on (i) the aggregated image descriptor for the first image and (ii) the aggregated image descriptor for the second image comprises:
determining the (i) the aggregated image descriptor for the first image and (ii) the aggregated image descriptor for the second image satisfy a similarity threshold; and in response to determining the (i) the aggregated image descriptor for the first image and (ii) the aggregated image descriptor for the second image satisfy a similarity threshold, classifying the pair of images as similar.

12. The system of claim 11, the operations comprising:
providing data associated with the second image for output based on classifying the pair of images as similar.

13. A non-transitory computer-readable medium storing software comprising instructions executable by one or more computers which, upon such execution, cause the one or more computers to perform operations comprising:
obtaining a pair of images comprising a first image and a second image;
segmenting each image of the pair into a respective foreground region and a respective background region;
generating (i) a first modified version of the first image by modifying the background region of the first image, (ii) a different, second modified version of the first image by modifying the foreground region of the first image, (iii) a first modified version of the second image by modifying the background region of the second image, and (iv) a different, second modified version of the second image by modifying the foreground region of the second image;
generating an image descriptor for each of (i) the first modified version of the first image in which the background region of the first image is modified, (ii) the different, second modified version of the first image in which the foreground region of the first image is modified, (iii) the first modified version of the second image in which the background region of the second image is modified, and (iv) the different, second modified version of the second image in which the foreground region of the second image is modified;
generating an aggregated image descriptor for the first image based at least on (i) the image descriptor for the first modified version of the first image in which the background region of the first image is modified, and (ii) the image descriptor for the different, second modified version of the first image in which the foreground region of the first image is modified;
generating an aggregated image descriptor for the second image based at least on (i) the image descriptor for the first modified version of the second image in which the background region of the second image is modified, and (ii) the image descriptor for the different, second modified version of the second image in which the foreground region is modified; and
classifying the pair of images as similar or as not similar based at least on (i) the aggregated image descriptor for the first image and (ii) the aggregated image descriptor for the second image.

14. The medium of claim 13, wherein the image descriptors each comprise an image histogram.

15. The medium of claim 13, wherein generating a different, second modified version of the first image by modifying the foreground region of the first image comprises:
replacing the background region of the obtained first image with a background region that has a single color that is different than a single color of the background region of the first modified version of the first image.

16. The medium of claim 13, wherein generating an aggregated image descriptor for the first image based at least on (i) the image descriptor for the first modified version of the first image in which the background region of the first image is modified, and (ii) the image descriptor for the different, second modified version of the first image in which the foreground region of the first image is modified comprises:
  determining an intersection between (i) the image descriptor for the first modified version of the first image, and (ii) the image descriptor for the different, second modified version of the first image; and
  generating the aggregated image descriptor as a representation of the determined intersection.

17. The medium of claim 13, wherein classifying the pair of images as similar or as not similar based at least on (i) the aggregated image descriptor for the first image and (ii) the aggregated image descriptor for the second image comprises:
  determining the (i) the aggregated image descriptor for the first image and (ii) the aggregated image descriptor for the second image satisfy a similarity threshold; and
  in response to determining the (i) the aggregated image descriptor for the first image and (ii) the aggregated image descriptor for the second image satisfy a similarity threshold, classifying the pair of images as similar.

\* \* \* \* \*